United States Patent Office 2,994,645
Patented Aug. 1, 1961

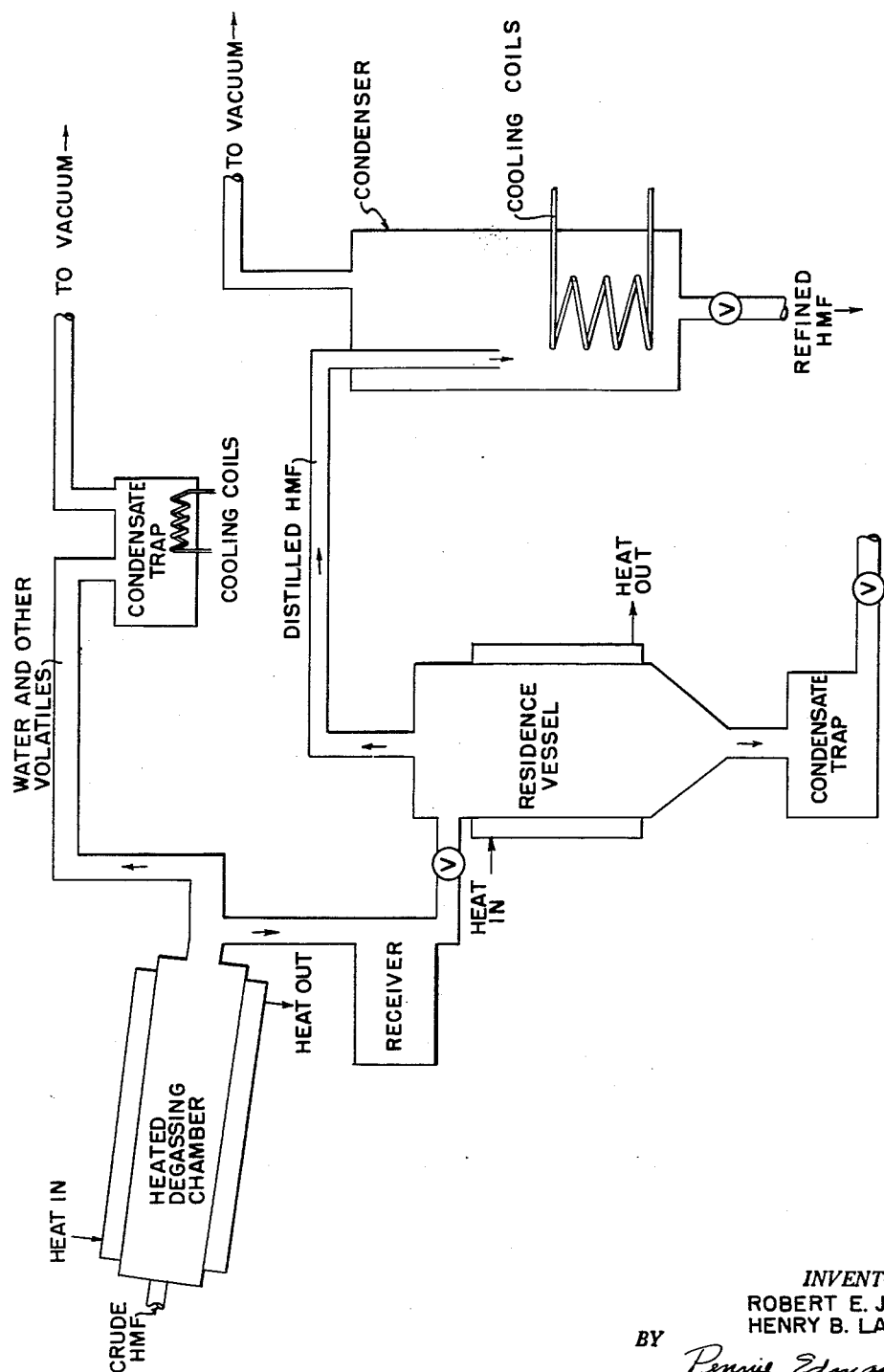

2,994,645
PURIFICATION OF HYDROXYMETHYL FURFURAL
Robert E. Jones, Rahway, and Henry B. Lange, Scotch Plains, N.J., assignors to Merck & Co., Inc., Rahway, N.J., a corporation of New Jersey
Filed Jan. 10, 1958, Ser. No. 708,078
2 Claims. (Cl. 202—52)

This invention relates to the purification of crude hydroxymethyl furfural (HMF), and has for its object the provision of an improved distillation process for distilling the crude HMF in good yield.

In the distillation of crude HMF as practiced heretofore, yields of only from about 45 to 60% could be obtained due either to decomposition of the HMF or to HMF ether formation. The presence of acid in the crude HMF leads to objectionably accelerated decomposition. However, even in the absence of acid, the low yield may also be due to ether formation according to the following reaction:

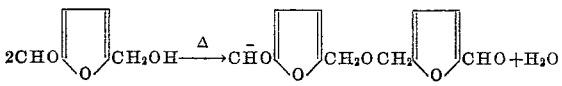

As shown by the reaction, water is formed and this leads to a non-reproducible pressure-temperature relationship and to a lowering of the vacuum capacity of the system. Both of these factors, the presence of acid and ether formation, have been deterrents to the successful purification of HMF by distillation.

This invention is based on the discovery that when crude HMF is distilled in a system that was thoroughly degassed under high vacuum, the crude HMF protected from moisture, and the distillation carried out continuously at high temperature and for the shortest practical contact time, that yields of over 90% of pure HMF are attainable. The process of the invention comprises the initial thorough degassification of the system, the maintenance of the crude HMF out of contact with moisture because of its highly hygroscopic property, and the continuous supply of crude moisture-free HMF to the system to provide a minimum of contact time at the distillation temperature while under a very high vacuum.

The accompanying drawing illustrates more or less diagrammatically an arrangement of apparatus suitable for carrying out a process of the invention.

In carrying out a process of the invention the crude HMF is first degassed under a high vacuum, say 30 microns or less. The degassing and moisture removal may be done by passing the crude HMF through a steam heated chamber under a vacuum to separate the water vapor and other gases that may be present. The degassed HMF is protected from contact with moisture and is fed continuously at a controlled rate into a distillation apparatus that is maintained under a high vacuum and at a suitable distillation temperature, for example about 175° C., and for the shortest possible residence time at the high temperature. The operation may be carried out advantageously by passing the HMF continuously into a residence vessel which is externally heated at the preferred temperature of from 150° C. to 200° C.

By controlling with valve V the rate of addition of HMF from the receiver for degassed HMF to the residence vessel where distillation takes place and the rate of removal of vapors the residence time of the liquid HMF at the distillation temperature can be controlled. The residence vessel is heated under a vacuum to distill the HMF which is passed into a condenser for the condensation of the purified HMF. In a small laboratory operation carried out in a distillation unit including a pot or distillation flask of 1 liter capacity, a condenser, and a receiving flask of 2 liters capacity, the crude HMF was passed into the distillation flask at the rate of 2 kg. per day. The results of this operation are listed in Table I.

Table I

| No. | Crude Wt., g. | Pot T° C. | Press., micr. | Vap. T., ° C. | Dist. Wt., g. | Percent Yield |
|---|---|---|---|---|---|---|
| 6 | 3,814.0 | 175 | 100–400 | 92–98 | 3,532.4 | 92.8 |
| 7 | 3,231.0 | 175 | 100 | 95.6 | 2,786.6 | 86.5 |
| 8–9 | 4,953.0 | 175 | 260 | 101.8 | 4,200.7 | 84.0 |
| 10–11 | 3,180.0 | 175 | 260 | 101.8 | 2,680.1 | 84.5 |
| Total | 15,178.0 | 175 | | | 13,199.8 | 87.2 |

The contact or residence time can vary from a very short time, say, about one second, to a few minutes, for example up to 20 minutes, depending on the rate of addition and distillation. One can put the HMF through as fast as desired, as only the percent distillation per pass is influenced. This relationship is shown in Table II in which the yields are weight yields per pass and have not been corrected for inert (non U.V.-bearing) materials.

The run 36B was a second pass distillation of 35 resulting in a total weight recovery of 70%. When this is corrected for inert materials, the U.V. yield is about 80%. U.V. yields of up to 96% are possible of attainment by the process of the invention. The distillation results were made on distillations carried out in an ASCO "50" Rota-film Laboratory Still which apparatus is referred to in a catalog entitled "High Vacuum and Molecular Distillation with the Rota-film Still," Arthur F. Smith Company, 311 Alexander Street, Rochester 4, N.Y.

Table II

| Run No. | Feed Rate, g. per min. | Run Time (min.) | Est. Hold-up (g.) | Press. (mm.) | Jacket Temp., ° C. | Wt. Percent Yield | Est. Residence Time (Min.) |
|---|---|---|---|---|---|---|---|
| 21 | 21.6 | 57 | 60 | 0.830 | 189 | 10.9 | 1.4 |
| 35 | 20.1 | 160 | 93 | 2.50 | 199 | 18.0 | 1.5 |
| 22 | 19.2 | 54 | 13 | 1.00 | 204 | 21.6 | 1.6 |
| 17 | 14.1 | 100 | 31 | 1.00 | 177 | 30.5 | 2.1 |
| 25 | 15.0 | 35 | 31 | 1.69 | 197 | 25.7 | 2.0 |
| 32 | 12.5 | 79 | 32 | 3.34 | 200 | 32.2 | 2.4 |
| 33 | 10.8 | 59 | 24 | 0.64 | 190 | 48.0 | 2.8 |
| 23 | 8.9 | 90 | 23 | 0.77 | 187 | 45.0 | 3.4 |
| 36B | 8.9 | 105 | 17 | 1.38 | 192 | 58.9 | 3.4 |
| 37 | 10.5 | 100 | 71 | 2.84 | 195 | 42.9 | 2.9 |
| 7F | 2.5 | 116 | 8 | 0.77 | 112 | 61.3 | 12.0 |
| 8 | 2.5 | 42 | 11 | 0.99 | 114 | 51.4 | 12.0 |
| 7E | 3.0 | 105 | 16 | 0.72 | 113 | 56.3 | 10.0 |
| 5 | 3.5 | 102 | 19 | 0.19 | | 34.4 | 8.6 |
| 4 | 3.0 | 118 | 9 | 0.24 | | 45.1 | 10.0 |
| 14 | 8.4 | 108 | 32 | 0.57 | 123 | 27.8 | 3.6 |
| 15 | 5.1 | 54 | 4 | 0.43 | 132 | 41.0 | 5.9 |
| 34 | 19.8 | 33 | 50 | 75.00 | 183 | 8.4 | 1.5 |

I claim:

1. The process for purifying crude hydroxymethyl furfural which comprises removing initially from the crude hydroxymethyl furfural gases and water by heating under a high vacuum, heating the degassed and moisture free hydroxymethyl furfural to distillation temperature in a distillation vessel while under a high vacuum of from 0.19 to 3.34 mm., and controlling the continuous addition of liquid hydroxymethyl furfural to the vessel and the rate of vapor removal therefrom to maintain a short residence time for liquid hydroxymethyl furfural in the vessel.

2. The process for purifying crude hydroxymethyl furfural which comprises initially and thoroughly removing from the crude hydroxymethyl furfural gases and water by heating under a high vacuum, heating the degassed and moisture free hydroxymethyl furfural to distillation temperature in a distillation vessel in the substantial absence of water vapor while under a high vacuum of from 0.19 to 3.34 mm., and controlling the continuous addition of liquid hydroxymethyl furfural to the vessel and the rate of vapor removal therefrom to maintain a residence time in the vessel of from 1 second to 20 minutes.

References Cited in the file of this patent

UNITED STATES PATENTS

| | | |
|---|---|---|
| 2,136,774 | Hichman | Nov. 15, 1938 |
| 2,210,926 | Hichman | Aug. 13, 1940 |
| 2,609,337 | Taylor et al. | Sept. 2, 1952 |

OTHER REFERENCES

Recueil "Travaux Chimiques des Pays-Bas" (1919), vol. 38. (Copy in Scientific Library.)